(12) United States Patent
Lee

(10) Patent No.: US 7,186,011 B2
(45) Date of Patent: Mar. 6, 2007

(54) MULTIPLE POINT DECORATIVE LIGHT STRIP

(76) Inventor: Jean-Hway Lee, P.O. Box No. 6-57, Junghe, Taipei 235 (TW)

( * ) Notice: Subject to any disclaimer, the term of this patent is extended or adjusted under 35 U.S.C. 154(b) by 63 days.

(21) Appl. No.: 11/076,978

(22) Filed: Mar. 11, 2005

(65) Prior Publication Data

US 2006/0203508 A1   Sep. 14, 2006

(51) Int. Cl.
*G02B 6/04* (2006.01)

(52) U.S. Cl. .................. 362/554; 362/559; 362/560; 362/551; 385/100; 385/102; 385/115; 385/116; 385/121; 385/901

(58) Field of Classification Search .............. 362/551, 362/554, 559, 560; 385/100, 102, 115, 116, 385/121, 901
See application file for complete search history.

(56) References Cited

U.S. PATENT DOCUMENTS 5,432,876 A * 7/1995 Appeldorn et al. ........... 385/31
6,278,833 B1 * 8/2001 Lee .............................. 385/100

* cited by examiner

*Primary Examiner*—Stephen F Husar
*Assistant Examiner*—Meghan K. Dunwiddie
(74) *Attorney, Agent, or Firm*—Troxell Law Office PLLC (57) ABSTRACT

A multiple point decorative light strip, which is particularly structured from a plurality of light emitting tubes to form a strip form, a surface of which generates multiple point shining light spots. The light strip includes a plurality of the light emitting tubes, which are juxtaposed and connected to form the strip form. A plurality of optical fibers are disposed within each of the light emitting tubes, A plurality of light spot generating grooves are defined in a staggered arrangement on a circumferential surface of each of the optical fibers. Reflected stimulated light from the plurality of light spot generating grooves generates multiple point light spots that enable a surface of the strip to form a magnificently shining decorative lighting effect.

9 Claims, 7 Drawing Sheets

MULTIPLE POINT DECORATIVE LIGHT STRIP

BACKGROUND OF THE INVENTION (a) Field of the Invention

The present invention relates to a multiple point decorative light strip structure, and more particularly provides a decorative light strip that produces multiple point luminescence, and which can be used to produce resplendent displaying and bright contrasting decorative light.

(b) Description of the Prior Art

Figure 1:
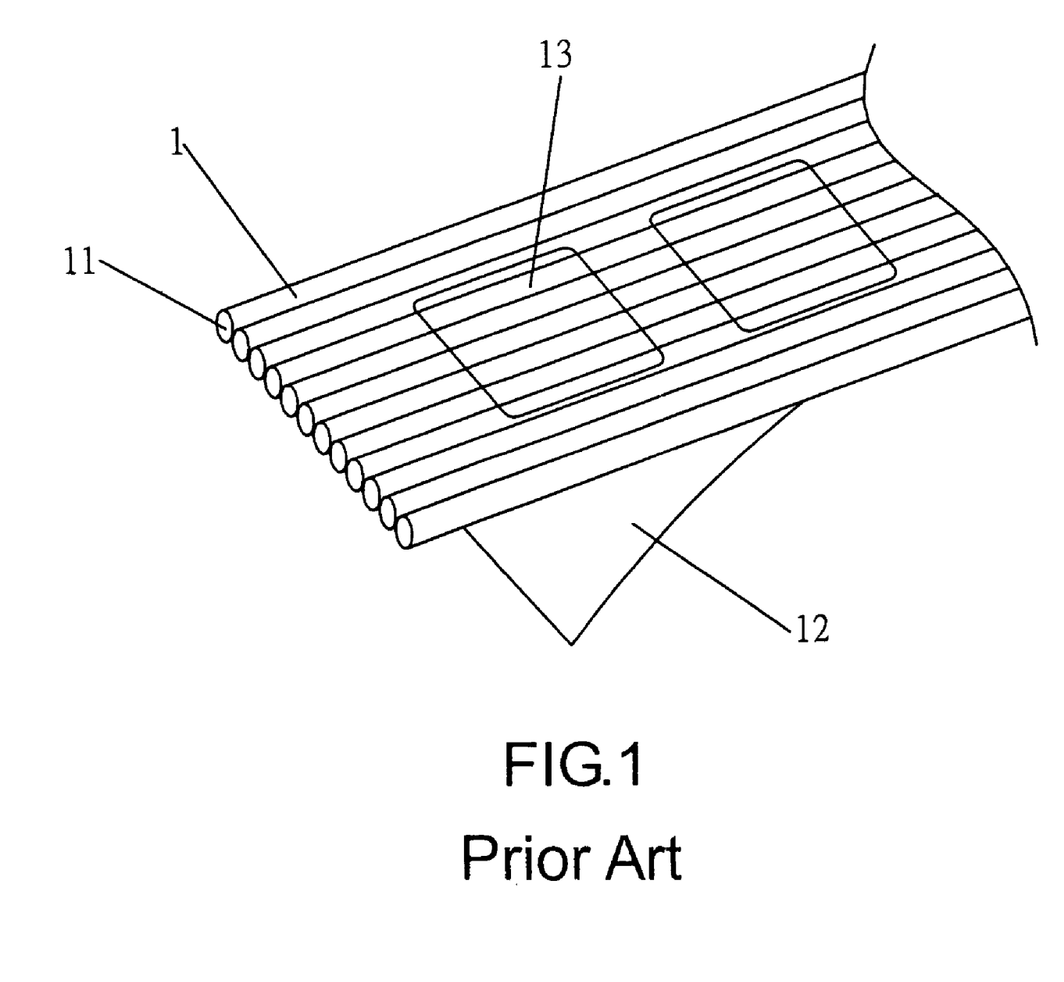
FIG. 1 shows a structural elevational view of a conventional optical fiber light emitting strip.

Regarding a decorative light strip, in addition to being fabricated from a luminescent board, in order to prevent rain from entering the light strip when disposed outdoors or for electrical considerations, and to achieve better weatherability, plastic optical fibers are utilized and arranged in a juxtaposed fashion to form a strip form. Complete puncturing of light-emitting surfaces is then carried out to enable a large volume of internal light to emerge and form a luminant surface. Referring to FIG. 1, which shows a light emitting strip 1 primarily structured from a plurality of optical fibers 11 assembled on a top surface of a base layer 12, thereby forming a strip form. After extensive puncturing of a surface of a reflective layer to form light leak areas 13, a large volume of fiber-optic transmitted light can be refracted and radiated outwards through the light leak areas 13, thereby achieving a surface-like lighting display effect.

The aforementioned light leak areas 13 can be further defined as graphics or letter shapes, and light emitting therefrom thus enables graphics and letters to luminesce.

Prior art developed by Toshiba Company effectuated total light leakage by complete puncturing of the strip surface in order to provide a computer LED panel with high contrast backlit projection.

Because of prerelease of a large volume of light, the aforementioned light stream strip implementation significantly curtails distance of effective light transmission to within tens of centimeters.

Furthermore, lumen output at an end adjoining a light source transmitter is far greater than at another end, which thus results in a non-uniform intensity of light along the strip.

Currently, enhancement in industrial technology has resulted in a corresponding reduction in costs, which has enabled mass application of plastic optical fibers as nighttime decorative lighting in homes or outdoors. However, regardless of whether used indoors or outdoors, increased demands are placed on transmission distance of the plastic optical fiber decorative lighting. Furthermore, light stream emission must approximate uniform luminescence in order to achieve balanced aesthetics. However, regardless of whether plastic optical fibers or precise high-grade glass optical fibers are used, because of implementing the aforementioned punctured light leak areas, the light stream transmission will similarly result in non-Uniform luminescence along the light strip because of prerelease of the light stream.

SUMMARY OF THE INVENTION

The present invention has made particular improvements to the aforementioned shortcomings, using light emitting tubes fabricated from flexible plastic optical fibers arranged so as to form a strip form, and multiple point resplendent light spots are defined within the light emitting tubes, thereby realizing a configuration applicable for use as decorative lighting in any location. The present invention is further characterized in that:

1. Flexibility of the light strip facilitates installation to the surface of an appendage of any form.
2. Uses distribution of a plurality of multiple point light spots, which enables forming a strip-like luminescence having uniform brightness when viewed at a distance.
3. Each of the light emitting tubes can carry colors of different wavelength, thereby producing variable color saturation and alternating glittering light spots.
4. A further embodiment of the present invention can realize a fixed form configuration, thereby facilitating installation in free-space to form a solid angle suspended fixation.
5. Because peripheries of the optical fibers are protected with a sleeve, thus, are not subject to dust contamination, and, therefore, suitable for installation outdoors, and, moreover, prevents damage from being stepped on.
6. Water-resistance is achieved through the peripheries of the optical fibers being protected with a transparent sleeve, thereby preventing damage from rain, and, apart from enabling installing the light emitting strip in a fishpond or swimming pool, moreover, achieves objective of using the light strip as a safety warning sign at night.
7. Because generating grooves that create light spots are of micron dimensions, thus length of effective light transmission is several meters.

The embodiment of the present invention is primarily structured from a plurality of the light emitting tubes assembled in a strip form, and a plurality of the optical fibers are disposed within each of the light emitting tubes. Moreover, the light spot generating grooves are defined in a staggered arrangement on a circumferential surface of each of the optical fibers. A plurality of the generating grooves thus form a fiber optic rod having a plurality of light spots.

A refractive effect caused by a circular cross-section curvature of a core of the optical fibers amplifies reflected light from the generating grooves, the light then being projected onto another side of the generating grooves, thereby forming amplified light spots thereon. Hence, the micron dimensions of the generating grooves produce a natural amplification of the light spots.

A further objective of the present invention is to provide the generating grooves with smooth mirror surfaces that achieve effective reflection therefrom, thereby increasing brightness of the amplified light spots.

A third objective of the present invention is to further lengthwise dispose support wires within the light emitting tubes adjacent to the optical fibers. The support wires enable modeling of three-dimensional suspended forms, and achieving solid angle fixations.

A fourth objective the present invention is to use a flexible bonding agent to bond together circumferential points of contact between the adjacent light emitting tubes, thereby enabling horizontal flexing of the light emitting tubes without tainting the light emitting surfaces, and forming a decorative light strip that enables bi-directional bright lighting.

A fifth objective of the present invention is to further use a matting layer as an underlay for disposing a plurality of the light emitting tubes in a parallel arrangement thereon, thereby forming the decorative light strip.

A sixth objective of the present invention is to provide an adhesive surface on a back surface of the matting layer of the decorative light strip, thereby enabling adhering to a face of a wall or surface of an appendage.

A seventh objective of the present invention is to assemble the light emitting tubes of the decorative light strip in a spaced arrangement. When the respective light emitting tubes carry colors of different wavelength, the spaced arrangement prevents light wave interference, thereby enabling contrast and clarity in color transmission.

An eighth objective of the present invention is to connect nearest circumferential points of contact between adjoining light emitting tubes of the decorative light strip with flexible connecting strips, thereby achieving objective of providing spacing of the light emitting tubes and flexibility of the decorative light strip.

A ninth objective of the present invention is to provide a reflecting surface having reflective ability for the matting layer, and upon which the light emitting tubes are arranged, thereby enabling light to reflect off the reflecting surface towards the light emitting surface.

To enable a further understanding of said objectives and the technological methods of the invention herein, brief description of the drawings is provided below followed by detailed description of the preferred embodiments.

DETAILED DESCRIPTION OF THE PREFERRED EMBODIMENTS

Figure 2:
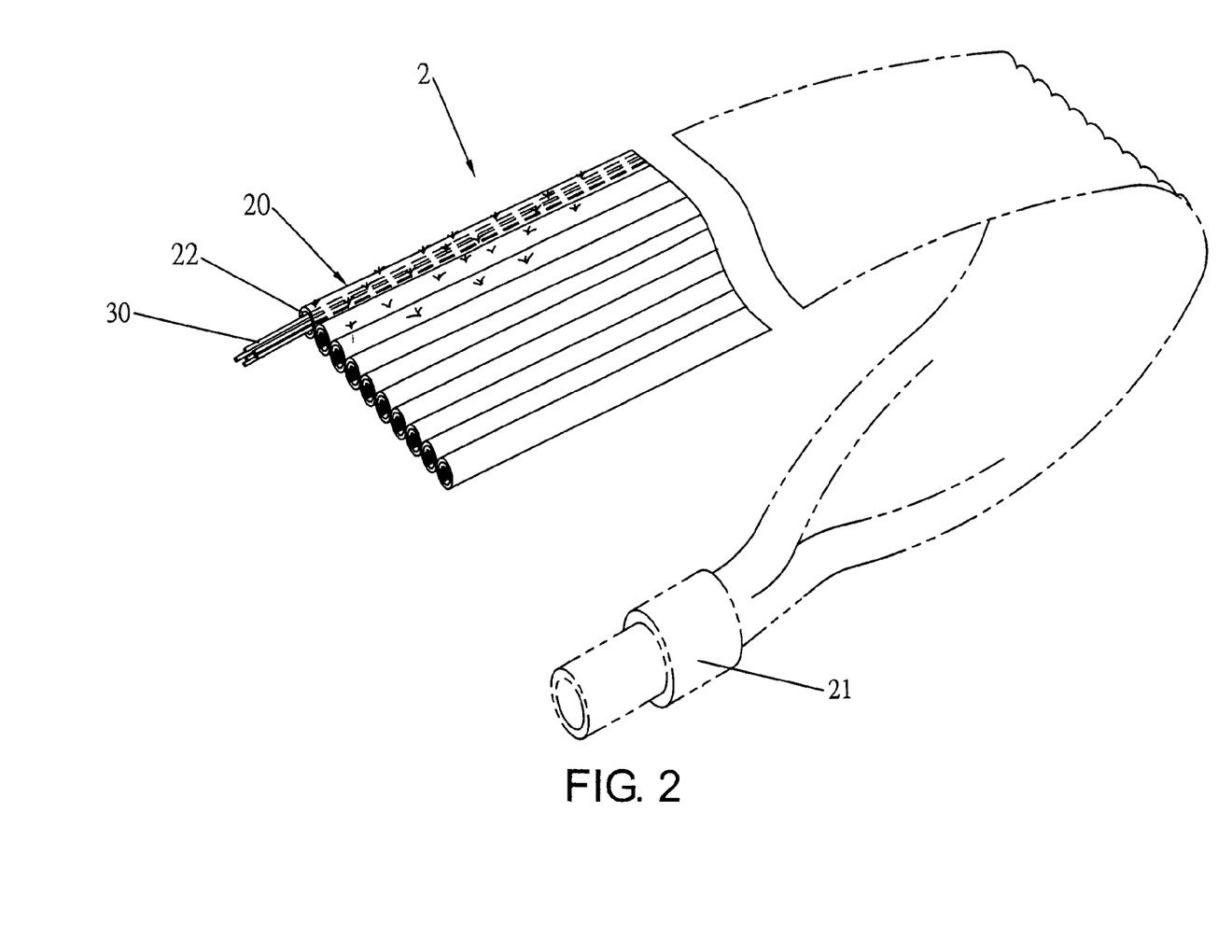
FIG. 2 shows an elevational view of an embodiment according to the present invention.

Referring to FIG. 2, which shows a structure of a multiple point decorative light strip, which particularly provides a decorative light strip 2 having multiple light-emitting points. Structural form of the strip 2 primarily comprises a plurality of light emitting tubes 20 arranged in a juxtaposed fashion. Each of the light emitting tubes 20 are structured from a transparent sleeve 22, interior of which are disposed a plurality of optical fibers 30. Each of the optical fibers 30 are made from plastic optical fiber material, and the light emitting tubes 20 are transparent flexible members. After assembling, the strip 2 forms a flexible structure.

The optical fibers 30 can be expanded in number to accommodate needs of light transmission lumen, and ends of the plurality of light emitting tubes 20 are gathered together in at least one light input coupler 21.

Figure 3:
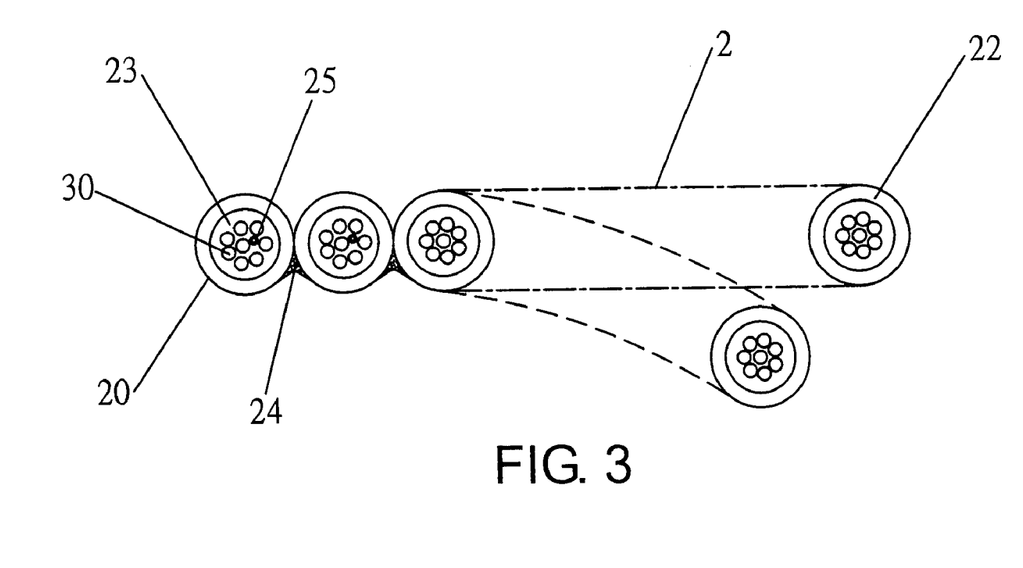
FIG. 3 shows a cross-sectional view of a light emitting strip and related optical fibers according to the present invention.

Referring to FIG. 3, each of the light emitting tubes 20 is structured from a plurality of optical fibers 30 disposed within the transparent sleeve 22, and Interspaces 23 form between each of the optic fibers 30. When the light emitting tubes 20 are flexed, the interspaces 23 prevent the circumferential surface of each of the optical fibers 30 from touching, and thus friction is avoided between the optical fibers 30.

In order to enforce provision for a suspension installation in free-space, a solid angle configuration is realized by further utilizing metal support wires 25 that can be manually flexed, and which are respectively coaxially disposed within the light emitting tubes 20. A luminous strip 1 is structurally formed from the light emitting tubes 20, and simultaneous flexing of the support wires 25 enables fixing a flexed shape of the luminous strip 1, thereby facilitating installation in free-space to form a solid angle suspended fixation.

A bonding agent 24 is injected at a position of an included angle between circumferential points of contact of each of the light emitting tubes 20. Using such a single included angle bonding method enables horizontal flexing of the strip 1. Moreover, if the bonding agent 24 is simultaneously injected at two included angles between each of the light emitting tubes 20, then horizontal flattening of the strip 1 can be attained. Hence, the embodiment of the present invention is applicable for use in achieving a decorative lighting effect, and employs the bonding method of injecting the bonding agent 24 at the single included angles to enable flexing into a preferred form, as depicted in FIG. 3.

Figure 4:
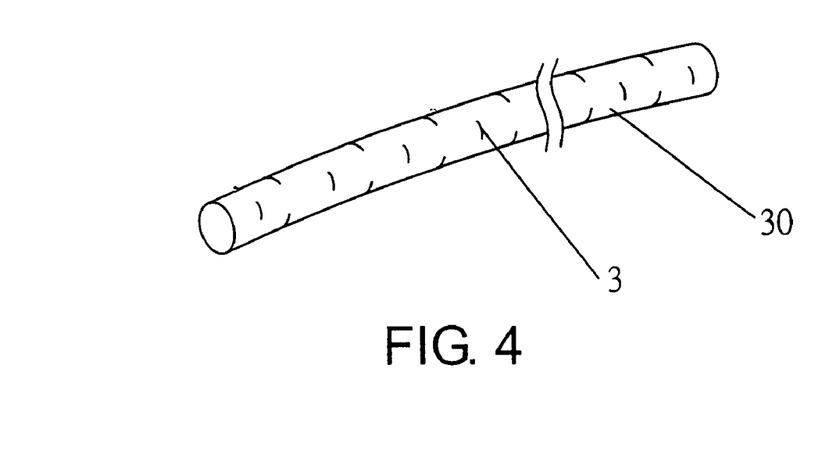
FIG. 4 shows an elevational schematic view of the optical fiber with defined generating grooves according to the present invention.

Referring to FIG. 4, which shows one of the optical fibers 30, a circumferential surface of which has a plurality of light spot generating grooves 3 defined in an alternating arrangement.

Figure 5:
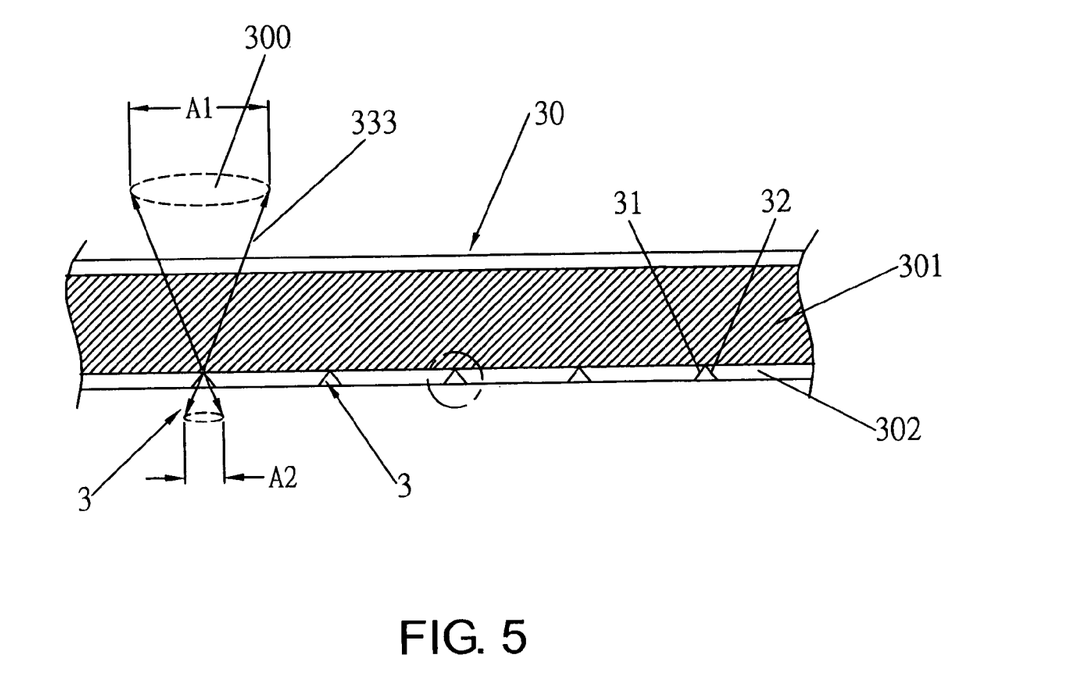
FIG. 5 shows a schematic view depicting principle of the light emitting effect of the generating grooves according to the present invention.
Figure 5A:
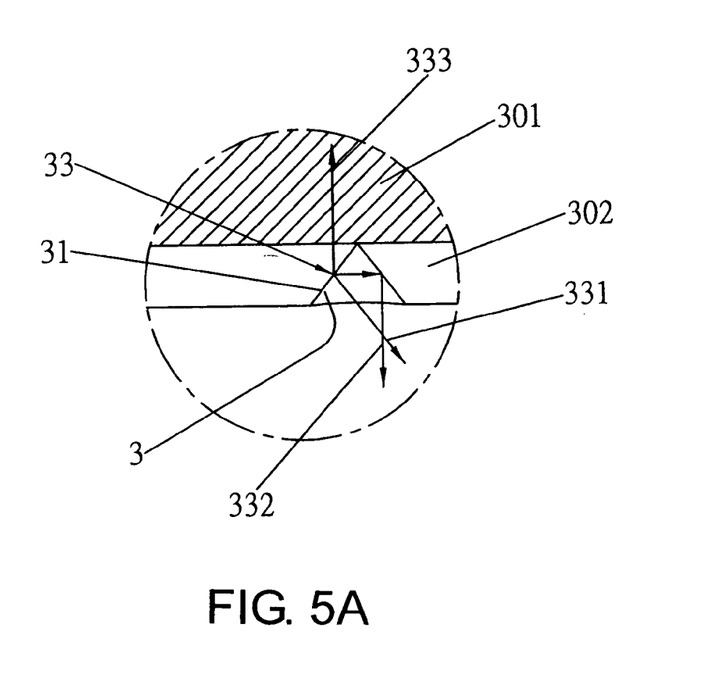
FIG. 5A shows an operation diagram depicting refracted light from the generating grooves according to the present invention.

Referring to FIGS. 5 and 5A, which shows the light spot generating grooves 3 defined on one of the optical fibers 30. Each of the light spot generating grooves 3 has a depth slightly less than that of a reflecting layer 302. Furthermore, each of the generating grooves 3 is formed to include surfaces 31 and 32. The surface 31, which corresponds to an incident light 33, causes a partial beam splitting effect whereby the generating groove 3 produces a direct refracted light 331, a scattered light 332 that has undergone reciprocal reflection and an approximate 50% reflected light 333. The reflected light 333 is amplified by passing through the refractive curvature of a core 301 and transmitted towards another side of the optical fiber 30 to form a relatively larger light spot 300. If a projected light spot area of the relatively larger light spot 300 is assumed to be A1, then a light spot area A2 produced directly by the generating groove 3 is smaller than A1.

The reason for the relatively larger light spot area A1 formed by the light spot 300 is because the reflected light 333 is transmitted through the core 301 having a circular cross-section, thereby forming a convex lens effect that refracts and amplifies the light 333 to form the relatively larger light spot 300. Hence, the embodiment of the present invention utilizes the larger light spots formed at the brightest positions on sides opposite to the generating grooves 3, and the light spots produced by the generating grooves are relatively smaller.

The depth and structural form of the generating grooves 3 are difficult to view with the naked eye because of their micron dimensions, and the light spots are correspondingly extremely small. The light spots easily visible at a distance are those amplified light spots reflected onto rear surfaces of the optical fibers 30.

Each of the optical fibers 30 of the present invention has a diameter of approximately 0.7 mm, and, thus, surface area is extremely small. However, the curvature lens effect of the core 301 is used to amplify the light spots to facilitate visualization thereof.

Each of the generating grooves 3 has a depth slightly less than that of the reflecting layer 302, and, thus, the generating grooves 3 do not puncture the structure of the core 301, and, thus, reserves effective light guide portion of the core 301 and maintains its mechanical strength.

Because dimensions of the defined structural form of the generating grooves 3 are within micron units, thus, diffuse effect of the generating grooves 3 is small, and variation in light brightness between front and rear ends of the optical fibers 30 is not visually observable, thereby substantiating that the present invention can effectively maintain effective light transmission over a long distance. Moreover, trial tests comparing lengths of light transmission of the present invention with that of existent optical fibers lacking the generating grooves 3 showed no observable difference in uniformity of light brightness between the two. Furthermore, if intense light spots are desired, then depth of each of the generating groove 3 can be extended into the core 301.

Figure 6:
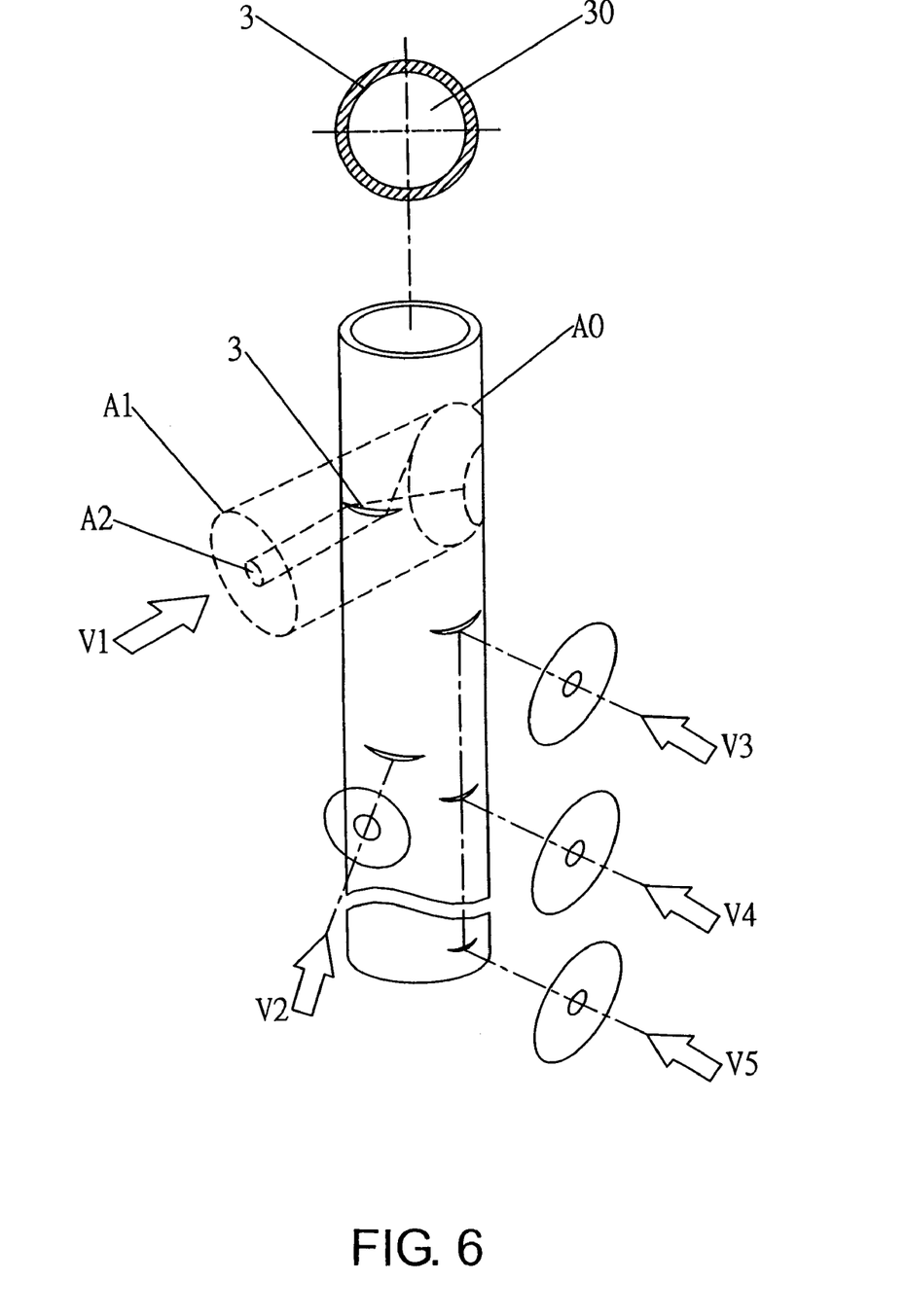
FIG. 6 shows a state diagram of light spots of the defined generating grooves on the optical fiber according to the present invention.

Referring to FIG. 6, because the generating grooves 3 of the present invention are defined at any solid angle in a staggered fashion on the circumferential surface of the optical fibers 30, thus, the light stream emitting from the generating grooves 3 defined on one side of the optical fiber 30 form relatively small light spot areas A1 (from a viewpoint V1 visual perspective), and after passing through the circular curvature amplification of the optical fiber 30, projected areas A0 form on a rear surface of the optical fiber 30, which form light spots A1 of relatively larger area when viewed from the viewpoint V1 perspective. Moreover, because the generating grooves 3 are defined at different angular positions on the surface of the optical fiber 30, thus, solid angle perspective viewpoints V2, V3, and so on, are formed. In other words, there is a high probability of a user being able to view the amplified light spots at any angular position.

The generating grooves 3 of the present invention can be further defined in a radial arrangement on the circumferential surface of the optical fiber 30. The optical fibers 30 are then disposed within the sleeve 22 so that the light emitting positions face a light emitting surface and left exposed when installed, thereby forming an arrangement of viewpoints V3, V4, V5, and so on.

Figure 7:
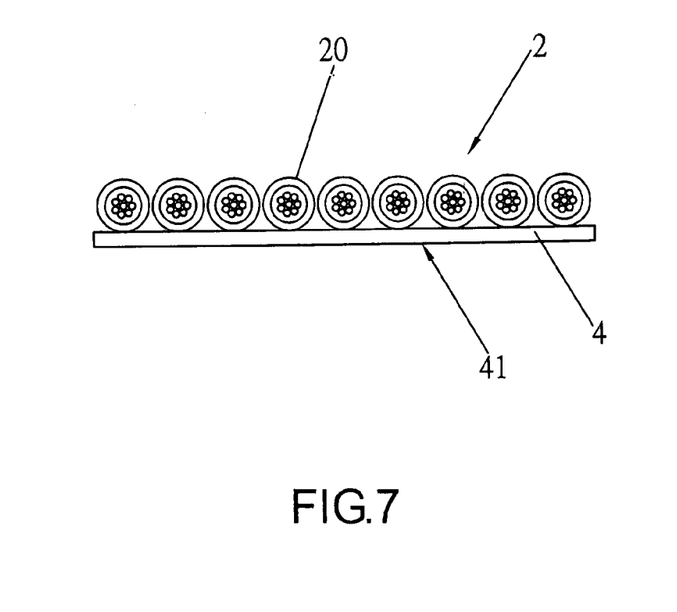
FIG. 7 shows a cross-sectional view of the light emitting strip structured to include a matting layer according to the present invention.

Referring to FIG. 7, which shows a structural configuration of the strip 2 of the present invention including a further flexible matting layer 4. The matting layer 4 provides for parallel arrangement of the light emitting tubes 20 atop thereof, thereby forming the strip 2. Moreover, a back surface of the flexible matting layer 4 is provided with an adhering surface 41, which facilitates adhering the strip 2 to the face of a wall or surface of an object. The adhering surface 41 can be a self-adhesive adhering surface and covered with barrier paper, which is torn off when desiring to install the strip 2, which thereby facilitates freely adhering the strip 2 to any surface by the user. Furthermore, because the matting layer 4 is flexible, flexing and disposition of the strip 2 is not affected.

Figure 8:
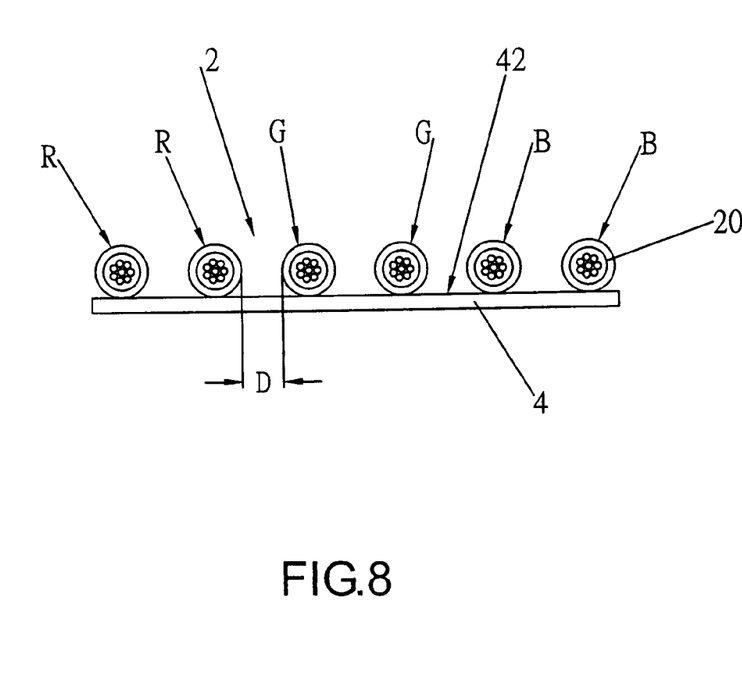
FIG. 8 shows a cross-sectional view of the light emitting strip with spaced light emitting tubes according to the present invention.

A top surface of the matting layer 4 provides for disposing the light emitting tubes 20 thereon, thereby forming a reflecting surface 42 having light reflecting effectiveness, as depicted in FIG. 8. Function of the light reflecting surface 42 is to provide for the spaced light emitting tubes 20 with a corresponding angular produced light stream reflected therefrom. Furthermore, the matting layer 4 achieves the objective of providing for radial arrangement of the light emitting tubes 20. If the light emitting tubes 20 respectively guide different colored light streams R, G, B, then the same strip 2 can form three colors, and spacings D between the light emitting tubes 20 causes light wave interference between the different colors, thereby creating a display of contrasting colors.

Figure 9:
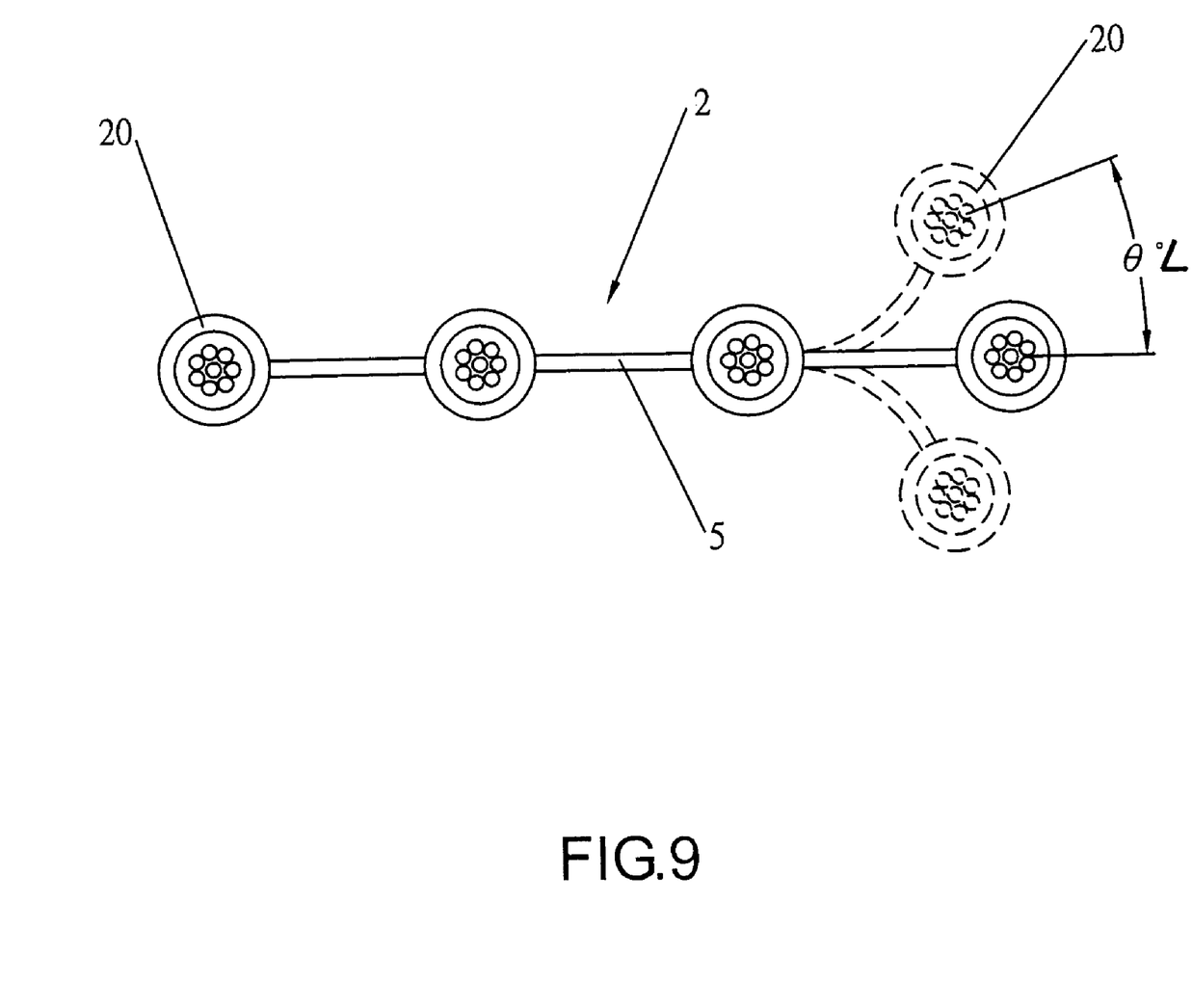
FIG. 9 shows a cross-sectional view of the light emitting strip structured to include connecting strips according to the present invention.

Referring to FIG. 9, which shows the strip 2 arranged with light emitting tubes 20 spaced at intervals, wherein nearest circumferential points of contact between adjacent light emitting tubes 20 are girth connected together with connecting strips 5. Moreover, the connecting strips 5 are flexible members that enable horizontal flexing of the strip 2. In addition, the centrally positioned connecting strips 5 used to connect the light emitting tubes 20 enable the strip 2 to realize bi-directional lighting.

It is of course to be understood that the embodiments described herein are merely illustrative of the principles of the invention and that a wide variety of modifications thereto may be effected by persons skilled in the art Without departing from the spirit and scope of the invention as set forth in the following claims.

What is claimed is:

1. A multiple point decorative light strip, which particularly provides a decorative light strip structured from optical fibers that can produce multiple point luminescence, comprising light emitting tubes, each of which are structured from a transparent sleeve, interior of which are disposed a plurality of optical fibers, each of the light emitting tubes are arranged in a juxtaposed fashion to form a strip form, and ends of the plurality of light emitting tubes are gathered together in at least one light input coupler, a plurality of light spot generating grooves are defined in a staggered arrangement on a circumferential surface of each of the optical fibers, wherein the structural formation of the strip from the light emitting tubes can be further implemented by nearest circumferential points of contact between adjacent light emitting tubes being connected together with connecting strips.

2. The multiple point decorative light strip as described in claim 1, wherein the generating grooves include groove surfaces having reflective and light splitting functionality.

3. The multiple point decorative light strip as described in claim 1, wherein a support wire can be further lengthwise disposed adjacent to the optical fibers within each of the light emitting tubes.

4. The multiple point decorative light strip as described in claim 1, wherein structural formation of the strip from the light emitting tubes can be further implemented by a bonding agent having bendable functionality being injected at a position of an included angle between adjoining circumferential points of contact of each of the light emitting tubes.

5. The multiple point decorative light strip as described in claim 1, wherein the structural formation of the strip from the light emitting tubes can be further implemented by spacing the light emitting tubes at intervals.

6. The multiple point decorative light strip as described in claim 1, wherein the structural formation of the strip from the light emitting tubes can be further implemented by using a matting layer, a top surface of which provides for parallel arrangement of the light emitting tubes thereon.

7. The multiple point decorative light strip as described in claim 6, wherein a back surface of the matting layer is an adhesive surface.

8. The multiple point decorative light strip as described in claim 1, wherein the top surface of the matting layer forms a reflecting surface.

9. The multiple point decorative light strip as described in claim 6, wherein the top surface of the matting layer forms a reflecting surface.

* * * * *